US009830161B2

(12) United States Patent
Lindholm et al.

(10) Patent No.: US 9,830,161 B2
(45) Date of Patent: Nov. 28, 2017

(54) TREE-BASED THREAD MANAGEMENT

(71) Applicant: NVIDIA CORPORATION, Santa Clara, CA (US)

(72) Inventors: John Erik Lindholm, Saratoga, CA (US); Michael C. Shebanow, Saratoga, CA (US)

(73) Assignee: NVIDIA Corporation, Santa Clara, CA (US)

( * ) Notice: Subject to any disclaimer, the term of this patent is extended or adjusted under 35 U.S.C. 154(b) by 687 days.

(21) Appl. No.: 14/160,329

(22) Filed: Jan. 21, 2014

(65) Prior Publication Data

US 2015/0205606 A1    Jul. 23, 2015

(51) Int. Cl.
  *G06F 9/38* (2006.01)
  *G06F 9/52* (2006.01)
(52) U.S. Cl.
  CPC .......... *G06F 9/3851* (2013.01); *G06F 9/3887* (2013.01); *G06F 9/528* (2013.01)
(58) Field of Classification Search
  CPC ....... G06F 9/3887; G06F 9/528; G06F 9/3851
  See application file for complete search history.

(56) References Cited

U.S. PATENT DOCUMENTS

| 7,353,369 | B1* | 4/2008 | Coon | G06F 9/30101 |
| | | | | 712/220 |
| 2007/0288730 | A1* | 12/2007 | Luick | G06F 9/3804 |
| | | | | 712/235 |
| 2010/0162095 | A1* | 6/2010 | Tsujii | G06F 17/3089 |
| | | | | 715/234 |
| 2011/0219221 | A1* | 9/2011 | Skadron | G06F 9/3851 |
| | | | | 712/235 |
| 2013/0042090 | A1* | 2/2013 | Krashinsky | G06F 9/3016 |
| | | | | 712/214 |

* cited by examiner

*Primary Examiner* — Aimee Li
*Assistant Examiner* — William Nguyen
(74) *Attorney, Agent, or Firm* — Artegis Law Group, LLP

(57) ABSTRACT

In one embodiment of the present invention, a streaming multiprocessor (SM) uses a tree of nodes to manage threads. Each node specifies a set of active threads and a program counter. Upon encountering a conditional instruction that causes an execution path to diverge, the SM creates child nodes corresponding to each of the divergent execution paths. Based on the conditional instruction, the SM assigns each active thread included in the parent node to at most one child node, and the SM temporarily discontinues executing instructions specified by the parent node. Instead, the SM concurrently executes instructions specified by the child nodes. After all the divergent paths reconverge to the parent path, the SM resumes executing instructions specified by the parent node. Advantageously, the disclosed techniques enable the SM to execute divergent paths in parallel, thereby reducing undesirable program behavior associated with conventional techniques that serialize divergent paths across thread groups.

20 Claims, 11 Drawing Sheets

QUAD NODE 550

| QUAD HEADER 560 | | | | |
|---|---|---|---|---|
| VA 512 | TOKEN 514 | UNUSED 515 | REFCOUNT 516 | PARENT 518 |

| QUAD PROGRAM COUNTER 570 |
|---|

| QUAD WARP INDEX ARRAY (WIA) 580 | | | | | | | |
|---|---|---|---|---|---|---|---|
| WIX0 | WIX1 | WIX2 | WIX3 | WIX4 | WIX5 | WIX6 | WIX7 |

FIG. 5A

NODE 500

| HEADER 510 | | | | |
|---|---|---|---|---|
| VA 512 | TOKEN 514 | UNUSED 515 | REFCOUNT 516 | PARENT 518 |

| PROGRAM COUNTER 520 |
|---|

| WARP INDEX ARRAY (WIA) 530 | | | | | | | |
|---|---|---|---|---|---|---|---|
| WIX0 | WIX1 | WIX2 | WIX3 | WIX4 | WIX5 | WIX6 | WIX7 |

TREE-BASED THREAD MANAGEMENT

BACKGROUND OF THE INVENTION

Field of the Invention

Embodiments of the present invention relate generally to computer processing and, more specifically, to tree-based thread management.

Description of the Related Art

In conventional computer processing systems, to execute a program within a particular processing device, a compiler first translates an associated software application text file into an optimized sequence of machine instructions. Typically, the software application text file is written in a general purpose programming language (e.g., C++). And the machine instructions are targeted to the selected processing device. In particular, the machine instructions may be targeted toward a parallel processing unit (PPU) that is capable of very high performance using a relatively large number of small, parallel execution threads on dedicated programmable hardware processing engines.

In some PPUs, single-instruction, multiple-thread (SIMT) techniques are used to support parallel execution of a large number of generally synchronized threads, using a common instruction unit configured to issue instructions to a set of processing engines within the PPU. In operation, the PPU may internally organize such threads into groups of related threads known as "thread groups" or "warps." Each thread in a warp concurrently executes the same program on different data and is assigned to a different processing engine. Individual threads included in a SIMT warp begin executing at the same program address. However conditional instructions in the program may cause different threads within a warp to follow divergent execution paths.

Many PPUs manage the execution of the threads at the granularity of the warp, using a hardware-based call return stack (CRS) in a push-pop manner. Consequently, each warp is associated with a single active program counter and only one path within a warp executes at a time—any divergent paths are buried in the CRS. In particular, the PPU serializes the execution of divergent paths across each warp, disabling the threads that are not included in the currently executing path. If a particular instruction is embedded within a divergent path, then only the threads that are active during the execution of the divergent path will encounter the instruction. After all the paths have finished sequentially executing, the threads converge to a single execution path.

One limitation to this approach to thread management is that serializing divergent paths may distort the semantics of the original software application text file and produce undesirable consequences. For instance, some instructions (e.g., barrier, spinlock, etc.) control program execution flow based on a specified condition that is evaluated per-warp for one or more warps. Since the PPU is configured to execute only a single path per warp, such instructions typically gate forward progress through the program for all of the threads in the warp. In particular, upon execution by a particular thread, the instruction may be configured to evaluate the specified condition against all of the threads included in the warp. In such a scenario, certain threads may never receive the opportunity to satisfy the condition and the program may deadlock.

Accordingly, what is needed in the art is a more effective technique to manage threads and groups of threads in parallel architectures.

SUMMARY OF THE INVENTION

One embodiment of the present invention sets forth a method for managing threads. The method includes causing a first set of threads to execute a first instruction that is specified by a first program counter, where the first set of threads and the first program counter are included in a first node of a tree divergence table. If causing the first set of threads to execute the first instruction causes a first execution path to diverge, then the method further includes generating a second node of the tree divergence table that includes a second set of threads that is a subset of the first set of threads and a second program counter specifying a second instruction that is sequential to the first instruction, generating a third node of the tree divergence table that includes a third set of threads that is a subset of the first set of threads and a third program counter specifying a third instruction that is on a second execution path, updating the first program counter to specify a synchronization instruction, and causing the second set of threads to execute the second instruction and the third set of threads to execute the third instruction. Or, if causing the first set of threads to execute the first instruction does not cause the first execution path to diverge, then the method further includes updating the first program counter to specify a fourth instruction that is sequential to the first instruction, and causing the first set of threads to execute the fourth instruction.

One advantage of the disclosed approach is that undesirable consequences attributable to serializing divergent paths across groups of threads in conventional thread management techniques are avoided. Consequently, more reliable forward progress through programs may be achieved. Further, a processor that implements a parallel architecture and incorporates the techniques disclosed herein executes divergent paths in parallel, thereby improving the speed at which the processor executes programs that includes divergent paths.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 5A is a conceptual diagram of a quad node included in the tree divergence table of FIG. 4, according to one embodiment of the present invention;

DETAILED DESCRIPTION

In the following description, numerous specific details are set forth to provide a more thorough understanding of the present invention. However, it will be apparent to one of skill in the art that the present invention may be practiced without one or more of these specific details.

System Overview

Figure 1:
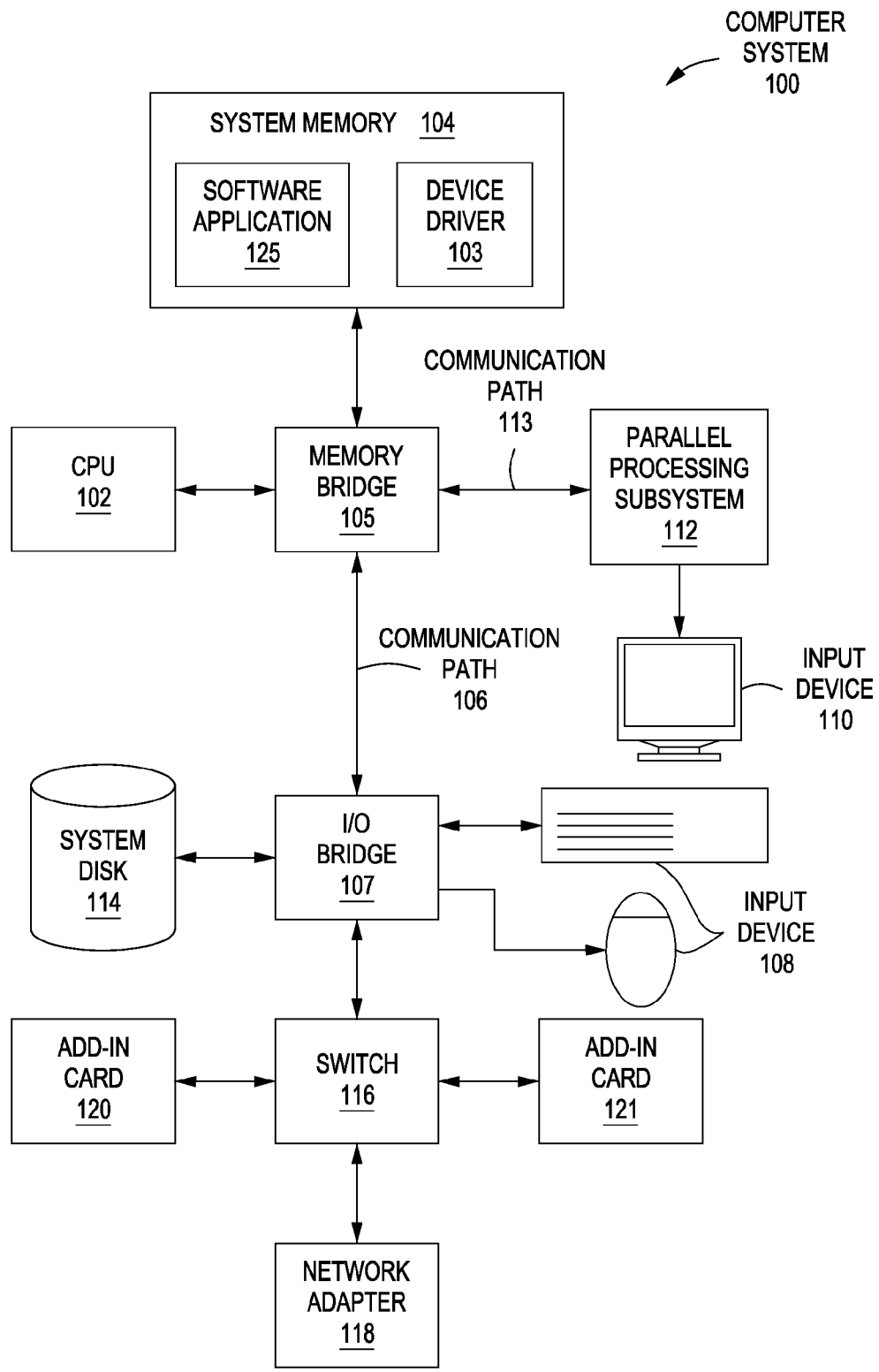
FIG. 1 is a block diagram illustrating a computer system configured to implement one or more aspects of the present invention.

FIG. 1 is a block diagram illustrating a computer system 100 configured to implement one or more aspects of the present invention. As shown, computer system 100 includes, without limitation, a central processing unit (CPU) 102 and a system memory 104 coupled to a parallel processing subsystem 112 via a memory bridge 105 and a communication path 113. Memory bridge 105 is further coupled to an I/O (input/output) bridge 107 via a communication path 106, and I/O bridge 107 is, in turn, coupled to a switch 116.

In operation, I/O bridge 107 is configured to receive user input information from input devices 108, such as a keyboard or a mouse, and forward the input information to CPU 102 for processing via communication path 106 and memory bridge 105. Switch 116 is configured to provide connections between I/O bridge 107 and other components of the computer system 100, such as a network adapter 118 and various add-in cards 120 and 121.

As also shown, I/O bridge 107 is coupled to a system disk 114 that may be configured to store content and applications and data for use by CPU 102 and parallel processing subsystem 112. As a general matter, system disk 114 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices. Finally, although not explicitly shown, other components, such as universal serial bus or other port connections, compact disc drives, digital versatile disc drives, film recording devices, and the like, may be connected to I/O bridge 107 as well.

In various embodiments, memory bridge 105 may be a Northbridge chip, and I/O bridge 107 may be a Southbrige chip. In addition, communication paths 106 and 113, as well as other communication paths within computer system 100, may be implemented using any technically suitable protocols, including, without limitation, AGP (Accelerated Graphics Port), HyperTransport, or any other bus or point-to-point communication protocol known in the art.

In some embodiments, parallel processing subsystem 112 comprises a graphics subsystem that delivers pixels to a display device 110 that may be any conventional cathode ray tube, liquid crystal display, light-emitting diode display, or the like. In such embodiments, the parallel processing subsystem 112 incorporates circuitry optimized for graphics and video processing, including, for example, video output circuitry. As described in greater detail below in FIG. 2, such circuitry may be incorporated across one or more parallel processing units (PPUs) included within parallel processing subsystem 112. In other embodiments, the parallel processing subsystem 112 incorporates circuitry optimized for general purpose and/or compute processing. Again, such circuitry may be incorporated across one or more PPUs included within parallel processing subsystem 112 that are configured to perform such general purpose and/or compute operations. In yet other embodiments, the one or more PPUs included within parallel processing subsystem 112 may be configured to perform graphics processing, general purpose processing, and compute processing operations. System memory 104 includes at least one device driver 103 configured to manage the processing operations of the one or more PPUs within parallel processing subsystem 112. The system memory 104 also includes a software application 125 that executes on the CPU 102 and may issue commands that control the operation of the PPUs.

In various embodiments, parallel processing subsystem 112 may be integrated with one or more other the other elements of FIG. 1 to form a single system. For example, parallel processing subsystem 112 may be integrated with CPU 102 and other connection circuitry on a single chip to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For example, in some embodiments, system memory 104 could be connected to CPU 102 directly rather than through memory bridge 105, and other devices would communicate with system memory 104 via memory bridge 105 and CPU 102. In other alternative topologies, parallel processing subsystem 112 may be connected to I/O bridge 107 or directly to CPU 102, rather than to memory bridge 105. In still other embodiments, I/O bridge 107 and memory bridge 105 may be integrated into a single chip instead of existing as one or more discrete devices. Lastly, in certain embodiments, one or more components shown in FIG. 1 may not be present. For example, switch 116 could be eliminated, and network adapter 118 and add-in cards 120, 121 would connect directly to I/O bridge 107.

Figure 2:
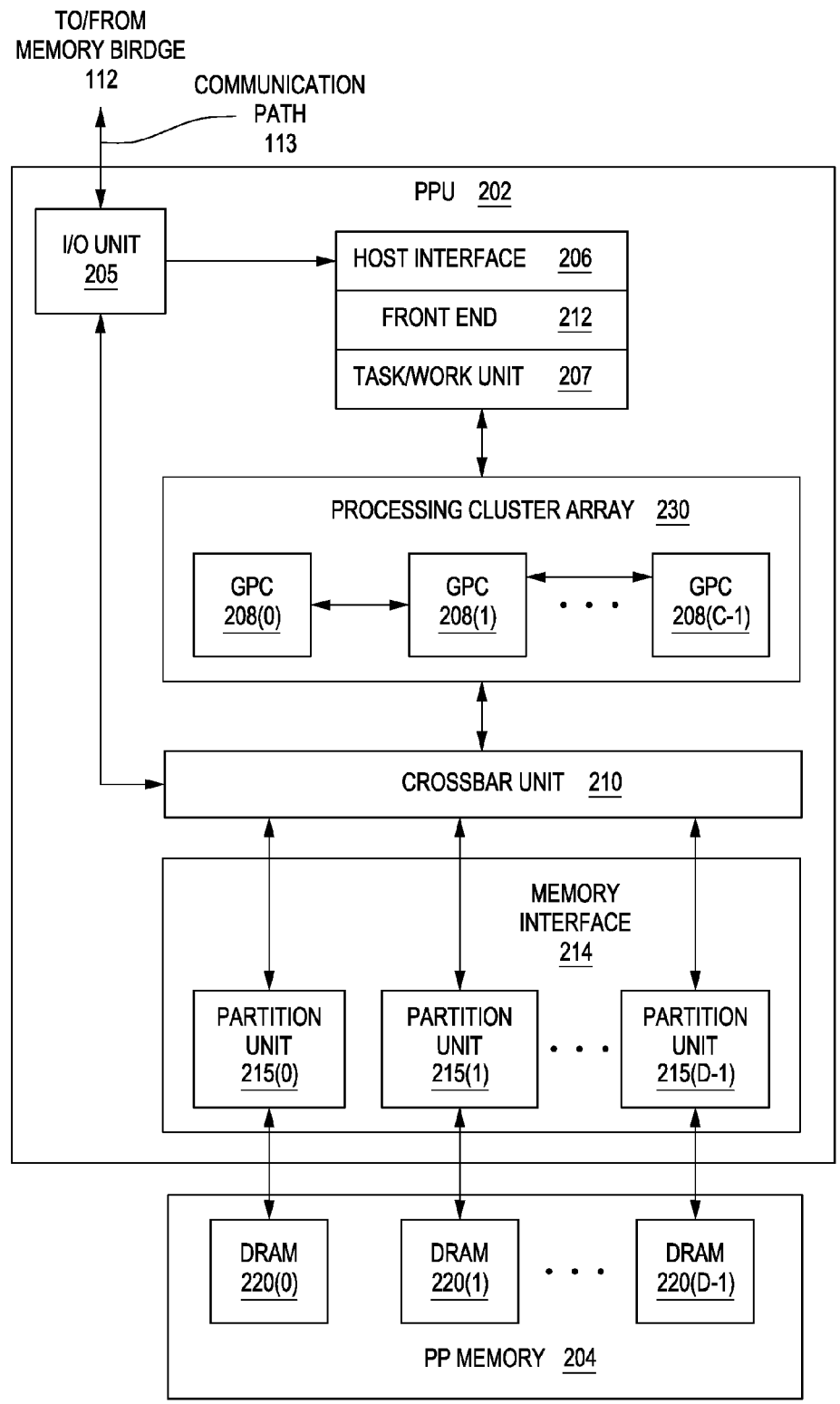
FIG. 2 is a block diagram of a parallel processing unit included in the parallel processing subsystem of FIG. 1, according to one embodiment of the present invention.

FIG. 2 is a block diagram of a parallel processing unit (PPU) 202 included in the parallel processing subsystem 112 of FIG. 1, according to one embodiment of the present invention. Although FIG. 2 depicts one PPU 202, as indicated above, parallel processing subsystem 112 may include any number of PPUs 202. As shown, PPU 202 is coupled to a local parallel processing (PP) memory 204. PPU 202 and PP memory 204 may be implemented using one or more integrated circuit devices, such as programmable processors, application specific integrated circuits (ASICs), or memory devices, or in any other technically feasible fashion.

In some embodiments, PPU 202 comprises a graphics processing unit (GPU) that may be configured to implement a graphics rendering pipeline to perform various operations related to generating pixel data based on graphics data supplied by CPU 102 and/or system memory 104. When processing graphics data, PP memory 204 can be used as graphics memory that stores one or more conventional frame buffers and, if needed, one or more other render targets as well. Among other things, PP memory 204 may be used to store and update pixel data and deliver final pixel data or display frames to display device 110 for display. In some embodiments, PPU 202 also may be configured for general-purpose processing and compute operations.

In operation, CPU 102 is the master processor of computer system 100, controlling and coordinating operations of other system components. In particular, CPU 102 issues commands that control the operation of PPU 202. In some embodiments, CPU 102 writes a stream of commands for PPU 202 to a data structure (not explicitly shown in either FIG. 1 or FIG. 2) that may be located in system memory 104, PP memory 204, or another storage location accessible to both CPU 102 and PPU 202. A pointer to the data structure is written to a pushbuffer to initiate processing of the stream of commands in the data structure. The PPU 202 reads command streams from the pushbuffer and then executes commands asynchronously relative to the operation of CPU 102. In embodiments where multiple pushbuffers are generated, execution priorities may be specified for each pushbuffer by an application program via device driver 103 to control scheduling of the different pushbuffers.

As also shown, PPU 202 includes an I/O (input/output) unit 205 that communicates with the rest of computer system 100 via the communication path 113 and memory bridge 105. I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to PP memory 204) may be directed to a crossbar unit 210. Host interface 206 reads each pushbuffer and transmits the command stream stored in the pushbuffer to a front end 212.

As mentioned above in conjunction with FIG. 1, the connection of PPU 202 to the rest of computer system 100 may be varied. In some embodiments, parallel processing subsystem 112, which includes at least one PPU 202, is implemented as an add-in card that can be inserted into an expansion slot of computer system 100. In other embodiments, PPU 202 can be integrated on a single chip with a bus bridge, such as memory bridge 105 or I/O bridge 107. Again, in still other embodiments, some or all of the elements of PPU 202 may be included along with CPU 102 in a single integrated circuit or system of chip (SoC).

In operation, front end 212 transmits processing tasks received from host interface 206 to a work distribution unit (not shown) within task/work unit 207. The work distribution unit receives pointers to processing tasks that are encoded as task metadata (TMD) and stored in memory. The pointers to TMDs are included in a command stream that is stored as a pushbuffer and received by the front end unit 212 from the host interface 206. Processing tasks that may be encoded as TMDs include indices associated with the data to be processed as well as state parameters and commands that define how the data is to be processed. For example, the state parameters and commands could define the program to be executed on the data. The task/work unit 207 receives tasks from the front end 212 and ensures that GPCs 208 are configured to a valid state before the processing task specified by each one of the TMDs is initiated. A priority may be specified for each TMD that is used to schedule the execution of the processing task. Processing tasks also may be received from the processing cluster array 230. Optionally, the TMD may include a parameter that controls whether the TMD is added to the head or the tail of a list of processing tasks (or to a list of pointers to the processing tasks), thereby providing another level of control over execution priority.

PPU 202 advantageously implements a highly parallel processing architecture based on a processing cluster array 230 that includes a set of C general processing clusters (GPCs) 208, where $C \geq 1$. Each GPC 208 is capable of executing a large number (e.g., hundreds or thousands) of threads concurrently, where each thread is an instance of a program. In various applications, different GPCs 208 may be allocated for processing different types of programs or for performing different types of computations. The allocation of GPCs 208 may vary depending on the workload arising for each type of program or computation.

Memory interface 214 includes a set of D of partition units 215, where $D \geq 1$. Each partition unit 215 is coupled to one or more dynamic random access memories (DRAMs) 220 residing within PPM memory 204. In one embodiment, the number of partition units 215 equals the number of DRAMs 220, and each partition unit 215 is coupled to a different DRAM 220. In other embodiments, the number of partition units 215 may be different than the number of DRAMs 220. Persons of ordinary skill in the art will appreciate that a DRAM 220 may be replaced with any other technically suitable storage device. In operation, various render targets, such as texture maps and frame buffers, may be stored across DRAMs 220, allowing partition units 215 to write portions of each render target in parallel to efficiently use the available bandwidth of PP memory 204.

A given GPCs 208 may process data to be written to any of the DRAMs 220 within PP memory 204. Crossbar unit 210 is configured to route the output of each GPC 208 to the input of any partition unit 215 or to any other GPC 208 for further processing. GPCs 208 communicate with memory interface 214 via crossbar unit 210 to read from or write to various DRAMs 220. In one embodiment, crossbar unit 210 has a connection to I/O unit 205, in addition to a connection to PP memory 204 via memory interface 214, thereby enabling the processing cores within the different GPCs 208 to communicate with system memory 104 or other memory not local to PPU 202. In the embodiment of FIG. 2, crossbar unit 210 is directly connected with I/O unit 205. In various embodiments, crossbar unit 210 may use virtual channels to separate traffic streams between the GPCs 208 and partition units 215.

Again, GPCs 208 can be programmed to execute processing tasks relating to a wide variety of applications, including, without limitation, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel/fragment shader programs), general compute operations, etc. In operation, PPU 202 is configured to transfer data from system memory 104 and/or PP memory 204 to one or more on-chip memory units, process the data, and write result data back to system memory 104 and/or PP memory 204. The result data may then be accessed by other system components, including CPU 102, another PPU 202 within parallel processing subsystem 112, or another parallel processing subsystem 112 within computer system 100.

As noted above, any number of PPUs 202 may be included in a parallel processing subsystem 112. For example, multiple PPUs 202 may be provided on a single add-in card, or multiple add-in cards may be connected to communication path 113, or one or more of PPUs 202 may be integrated into a bridge chip. PPUs 202 in a multi-PPU system may be identical to or different from one another. For example, different PPUs 202 might have different numbers of processing cores and/or different amounts of PP memory 204. In implementations where multiple PPUs 202 are present, those PPUs may be operated in parallel to process data at a higher throughput than is possible with a single PPU 202. Systems incorporating one or more PPUs 202 may be implemented in a variety of configurations and form factors, including, without limitation, desktops, laptops, handheld personal computers or other handheld devices, servers, workstations, game consoles, embedded systems, and the like.

Figure 3:
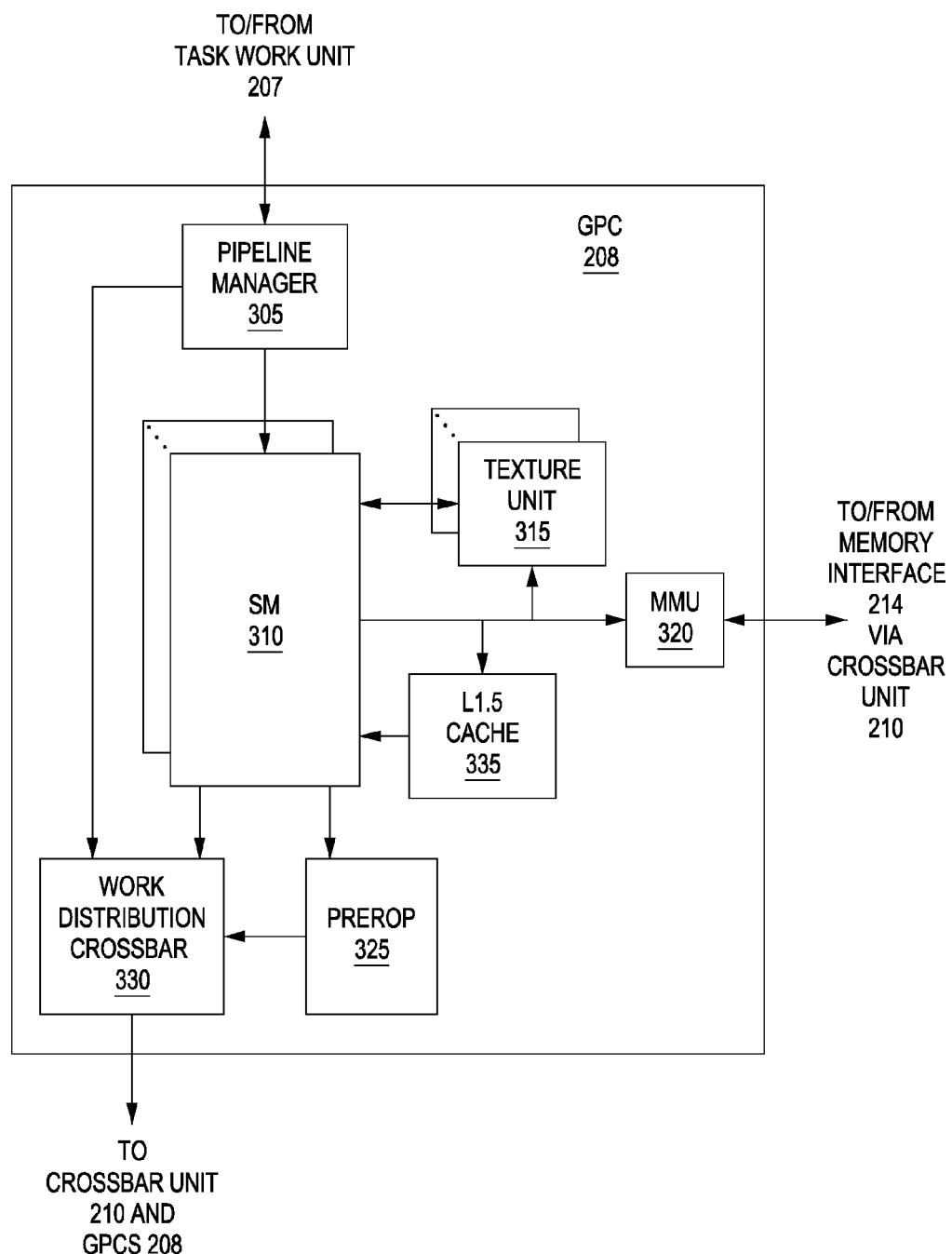
FIG. 3 is a block diagram of a general processing cluster included in the parallel processing unit of FIG. 2, according to one embodiment of the present invention.

FIG. 3 is a block diagram of a GPC 208 included in PPU 202 of FIG. 2, according to one embodiment of the present invention. In operation, GPC 208 may be configured to execute a large number of threads in parallel to perform graphics, general processing and/or compute operations. As used herein, a "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within GPC 208. Unlike a SIMD execution regime, where all processing engines typically execute identical instructions, SIMT execution allows different threads to more readily follow divergent execution paths through a given program. Persons of ordinary skill in the art will understand that a SIMD processing regime represents a functional subset of a SIMT processing regime.

Operation of GPC 208 is controlled via a pipeline manager 305 that distributes processing tasks received from a work distribution unit (not shown) within task/work unit 207 to one or more streaming multiprocessors (SMs) 310. Pipeline manager 305 may also be configured to control a work distribution crossbar 330 by specifying destinations for processed data output by SMs 310.

In one embodiment, GPC 208 includes a set of P of SMs 310, where P≥1. Also, each SM 310 includes a set of functional execution units (not shown), such as execution units and load-store units. Processing operations specific to any of the functional execution units may be pipelined, which enables a new instruction to be issued for execution before a previous instruction has completed execution. Any combination of functional execution units within a given SM 310 may be provided. In various embodiments, the functional execution units may be configured to support a variety of different operations including integer and floating point arithmetic (e.g., addition and multiplication), comparison operations, Boolean operations (AND, OR, XOR), bit-shifting, and computation of various algebraic functions (e.g., planar interpolation and trigonometric, exponential, and logarithmic functions, etc.). Advantageously, the same functional execution unit can be configured to perform different operations.

In operation, each SM 310 is configured to process one or more thread groups. As used herein, a "thread group" or "warp" refers to a group of threads concurrently executing the same program on different input data, with one thread of the group being assigned to a different execution unit within an SM 310. A thread group may include fewer threads than the number of execution units within the SM 310, in which case some of the execution may be idle during cycles when that thread group is being processed. A thread group may also include more threads than the number of execution units within the SM 310, in which case processing may occur over consecutive clock cycles. Since each SM 310 can support up to G thread groups concurrently, it follows that up to G*P thread groups can be executing in GPC 208 at any given time.

Additionally, a plurality of related thread groups may be active (in different phases of execution) at the same time within an SM 310. This collection of thread groups is referred to herein as a "cooperative thread array" ("CTA") or "thread array." The size of a particular CTA is equal to p*k, where k is the number of concurrently executing threads in a thread group, which is typically an integer multiple of the number of execution units within the SM 310, and p is the number of thread groups simultaneously active within the SM 310.

Although not shown in FIG. 3 each SM 310 contains a level one (L1) cache or uses space in a corresponding L1 cache outside of the SM 310 to support, among other things, load and store operations performed by the execution units. Each SM 310 also has access to level two (L2) caches (not shown) that are shared among all GPCs 208 in PPU 202. The L2 caches may be used to transfer data between threads. Finally, SMs 310 also have access to off-chip "global" memory, which may include PP memory 204 and/or system memory 104. It is to be understood that any memory external to PPU 202 may be used as global memory. Additionally, as shown in FIG. 3, a level one-point-five (L1.5) cache 335 may be included within GPC 208 and configured to receive and hold data requested from memory via memory interface 214 by SM 310. Such data may include, without limitation, instructions, uniform data, and constant data. In embodiments having multiple SMs 310 within GPC 208, the SMs 310 may beneficially share common instructions and data cached in L1.5 cache 335.

Each GPC 208 may have an associated memory management unit (MMU) 320 that is configured to map virtual addresses into physical addresses. In various embodiments, MMU 320 may reside either within GPC 208 or within the memory interface 214. The MMU 320 includes a set of page table entries (PTEs) used to map a virtual address to a physical address of a tile or memory page and optionally a cache line index. The MMU 320 may include address translation lookaside buffers (TLB) or caches that may reside within SMs 310, within one or more L1 caches, or within GPC 208.

In graphics and compute applications, GPC 208 may be configured such that each SM 310 is coupled to a texture unit 315 for performing texture mapping operations, such as determining texture sample positions, reading texture data, and filtering texture data.

In operation, each SM 310 transmits a processed task to work distribution crossbar 330 in order to provide the processed task to another GPC 208 for further processing or to store the processed task in an L2 cache (not shown), parallel processing memory 204, or system memory 104 via crossbar unit 210. In addition, a pre-raster operations (preROP) unit 325 is configured to receive data from SM 310, direct data to one or more raster operations (ROP) units within partition units 215, perform optimizations for color blending, organize pixel color data, and perform address translations.

It will be appreciated that the core architecture described herein is illustrative and that variations and modifications are possible. Among other things, any number of processing units, such as SMs 310, texture units 315, or preROP units 325, may be included within GPC 208. Further, as described above in conjunction with FIG. 2, PPU 202 may include any number of GPCs 208 that are configured to be functionally similar to one another so that execution behavior does not depend on which GPC 208 receives a particular processing task. Further, each GPC 208 operates independently of the other GPCs 208 in PPU 202 to execute tasks for one or more application programs. In view of the foregoing, persons of ordinary skill in the art will appreciate that the architecture described in FIGS. 1-3 in no way limits the scope of the present invention.

Thread Management

Again, the software application 125 configures the PPU 202 to execute a large number of threads in parallel to perform graphics, general processing and/or compute operations. Each SM 310 included in the PPU 202 is configured to process a set of threads that are organized into one or more cooperative thread arrays (CTAs). To leverage the architecture of the SM 310, the threads within each CTA are organized as warps. Conventional multiprocessors manage the execution of the threads at the granularity of the warp, serializing divergent paths across each warp. By contrast, the SM 310 is configured to manage the execution of the threads at the granularity of the thread while retaining the hierarchical structure of warps and CTAs. In particular, as described in greater detail herein, the SM 310 is configured to manage the execution of the threads using a tree of execution nodes for each CTA. Advantageously, this tree of execution nodes enables the SM 310 to concurrently execute divergent paths across each warp.

Figure 4:
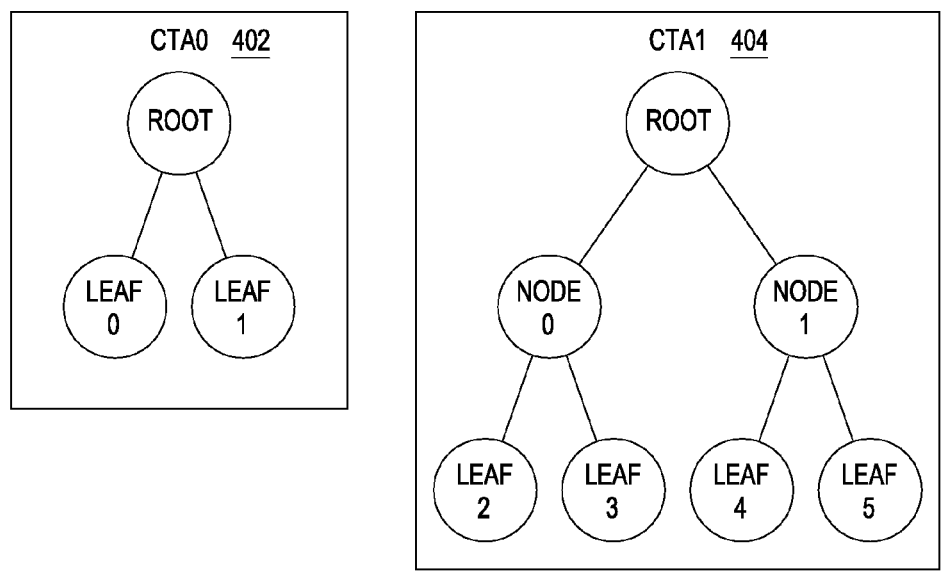
FIG. 4 is a conceptual diagram of a tree divergence table implemented by the streaming multiprocessor of FIG. 3, according to one embodiment of the present invention.

FIG. 4 is a conceptual diagram of a tree divergence table (TDT) 410 implemented by the streaming multiprocessor (SM) 310 of FIG. 3, according to one embodiment of the present invention. In operation, the SM 310 uses the TDT 410 to manage the execution of each thread executing on the SM 310. As shown, each row included in the TDT 410 represents a different flattened tree of nodes and is associated with a different cooperative thread array (CTA) executing on the SM 310. In alternate embodiments, each row included in the TDT 410 may be associated with a different pixel sub-tile instead of a CTA.

When the SM 310 launches a CTA, the SM 310 generates a root node that specifies all of the active threads in the CTA and initializes a row in the TDT 410 to include this root node. As detailed in conjunction with FIGS. 5A-5B, the SM 310 executes instructions for each active thread in the CTA based on a program counter included in the root node. If executing a particular instruction causes the active threads to diverge, then the SM 310 creates a separate child node for each execution path and adds the child nodes to the row of the TDT 410 that is associated with the root node. Further, the SM 310 links each child node back to the root node, which becomes the parent node of the new child nodes. Based on the instruction that initiates the divergence, the SM 310 sets each of the child nodes to specify a different program counter and a different, mutually exclusive subset of the active threads in the CTA associated with the parent node.

After creating child nodes, the SM 310 suspends execution of the parent node, and begins executing the child nodes. As the SM 310 executes the child nodes, the SM 310 may execute one or more instructions that cause the active threads to further diverge. The SM 310 manages divergent paths of execution by recursively creating child nodes for each execution path.

In general, each node that is descended from the root node is either a leaf node or an internal node. If a node is at the lowest level of the tree hierarchy, then the node is a leaf node. If a node is not at the lowest level of the tree hierarchy, then the node is an internal node. Advantageously, the SM 310 may execute all leaf nodes concurrently. In operation, if the number of active threads specified by the leaf nodes exceeds the number of execution units within the SM 310, then the SM 310 may execute the leaf nodes over consecutive clock cycles. The SM 310 may schedule the execution of the leaf nodes in any technically feasible fashion. After a leaf node finishes executing, then the SM 310 removes the leaf node from the TDT 410—pruning the tree that includes the leaf node. In alternate embodiments, the SM 310 may disable the leaf node instead of removing the leaf node from the TDT 410.

As shown, the SM 310 is executing two CTAs—a CTA0 402 and a CTA1 404. For each of the CTAs, the SM 420 manages the active threads using a separate tree. The tree representing CTA0 402 includes a root node and two leaf nodes (leaf0 and leaf1). Consequently, one row of the TDT 410 includes the root node associated with the CTA0 402, the leaf0, and the leaf1. The tree representing CTA1 404 includes a root node, two internal nodes (node0 and node1), and four leaf nodes (leaf2, leaf 3, leaf4, and leaf5). As shown, the root node of CTA1 404 is the parent of node0 and node1, node0 is the parent of leaf2 and leaf3, and node1 is the parent of leaf4 and leaf5. A second row of the TDT 410 includes the root node associated with the CTA1 404, the node0, the node1, the leaf2, the leaf3, the leaf4, and the leaf5. For explanatory purposes, FIG. 4 depicts the nodes that the SM 310 is executing as shaded. As shown, the SM 310 is executing all the leaf nodes included in both the CTA0 402 and the CTA1 404. Other trees, not shown in FIG. 4, may include any number of nodes, each parent node may have any number of child nodes, and the number of child nodes may vary between parents.

FIG. 5A is a conceptual diagram of a quad node 550 included in the tree divergence table (TDT) 410 of FIG. 4, according to one embodiment of the present invention. The quad node 550 is associated with a set of 1-1024 threads that are organized as eight groups of four warps, known as "quad-warps." As shown, the quad node 550 includes a quad header 560, a quad program counter 570, and a quad warp index array (WIA) 580. The quad header 560 includes 4 bytes, the quad program counter 570 includes 4 bytes, and the quad WIA 580 includes 8 bytes organized as eight quad-warp indices. Notably, the total memory allocated to the quad node 550 is 16 bytes, and the quad node 550 is equivalent to a CRS stack entry. Further, each 32-thread quad-warp may be associated with a maximum of 256 quad nodes 550 and, consequently, the quad WIA 580 may vary from 0 through 255. In alternate embodiments, the amount of memory allocated to the quad node 550 may differ from 16 bytes and the quad node 550 may store and partition the allocated memory across any number of different entries.

The SM 310 operates on the quad node 550 based on the quad header 560. In operation, if the quad header 560 specifies that the quad node 550 is active, then the SM 310 executes instructions specified by the quad program counter 570 for each active thread in the quad node 550. By contrast, if the quad header 560 specifies that the quad node 550 is not active, then the SM 310 does not execute the quad node 550. In an inactive parent quad node 550, the quad program counter 570 specifies a specific synchronization point at which the quad node 550 resumes executing when the quad node 550 becomes active. The active threads in the quad node 550 are specified by the quad WIA 580 in conjunction with ancillary data structures. Advantageously, the ancillary data structures include information that may be shared between multiple quad nodes 550, thereby optimizing the use of memory resources, such as the PP memory 204.

As also shown, the quad header 560 includes a valid/active (VA) 512, a token 514, a refcount 516, a parent 518, and an unused 515. The valid/active 512 and the token 514 both represent the operability of the quad node 550. The valid/active 512 is typically cached in hardware to optimize execution efficiency. The acceptable values of the valid/active 512 include, within limitation, "unable to execute" and "executable." A valid/active 512 value of "unable to execute" indicates that the quad node 550 is not a leaf node. By contrast, a valid/active 516 value of "executable" indicates that the quad node 550 is an executable leaf node. The acceptable values of the token 514 include, without limitation, "none" and "SYNC." If the token 514 is set to "none," then the SM 310 executes instructions specified by the quad program counter 570 for each active thread in the quad node 550. If the token 514 is set to "SYNC," then the quad node 550 is the target of a synchronization operation and the program counter 570 represents the synchronization point. When the active threads specified by the quad node 550 reconverge, then the SM 310 sets the valid/active 512 to "executable" and sets the token 514 to "none." Accordingly, the SM 310 resumes executing the quad node 550.

The parent 518 and the refcount 516 both reflect the hierarchical organization of the tree that includes the quad node 550. If the quad node 550 is a child quad node 550, then the parent 518 points to the immediate parent quad node 550 of the child quad node 550. If the quad node 550 is a root quad node 550, then the parent 518 is self-referential (i.e., points to itself). The refcount 516 represents the number of child quad nodes 550 that are immediately descended from the quad node 550. As a quad node 550 diverges, the SM 310 increases the refcount 516 included in the quad node 550 based on the number of new child quad nodes 550. As a non-root quad node 550 finishes executing, the SM 310 decreases the refcount 516 included in the quad node 550 specified by the parent 518. In some embodiments, the SM 310 updates the valid/active 512 and the token 514 based on the refcount 516.

In particular, the quad header 560 includes 2 bits to represent the valid/active 512, 4 bits to represent the token 514, 10 bits to represent the refcount 516, and 12 bits to represent the parent 518. The unused 515 represent 4 bits that are unused in the implementation-specific quad node 550. In alternate embodiments, the quad header 560 may store any information in any format that enables the SM 310 to effectively direct the execution of the quad node 550. For instance, in some embodiments, the quad header 560 may not include the valid/active 512, and the acceptable values of the token 514 may be "executable," "non-executable," and "unused." Further, the quad header 560 may not include the refcount 516. In such embodiments, the SM 310 may compare the active threads across multiple quad nodes 550 to determine whether the quad node 550 is a descendent of another quad node 550. In addition, if the quad node 550 is a root node, then the parent 518 may be a null value.

The WIA 580 includes eight quad-warp indices (wixs), each of which corresponds to a different quad-warp. In some embodiments, the SM 310 is configured to operate on a subset of the entries included in the WIA 580, and the remaining entries are unused. Advantageously, to reduce the memory required to store the node 550, the quad WIA 580 refers to two ancillary data structures that include information that is shared between multiple quad nodes 550. For each quad-warp index, the SM 310 uses the position of the quad-warp index (wix) to locate a corresponding quad-warp id (wid) included in a warp mapping table (WMT). Subsequently, for each quad-warp index, the SM 310 uses the value of the quad-warp index and the corresponding quad-warp id to locate a warp mask entry included in a two-dimensional warp mask divergence table (WDT). In particular, the value of the quad-warp index corresponds to a column of the WDT and the value of the quad-warp id corresponds to a row of the WDT.

In operation, if the token 514 is "none" and the instruction specified by the quad program counter 570 causes the active threads specified by the quad WIA 580 to diverge, then the SM 310 creates child quad nodes 550. Each child quad node 550 represents a different execution path. Accordingly, the SM 310 sets the quad program counters 570 included in the child quad nodes 550 to different instructions. The SM 310 also sets the quad WIAs 580 included in the child quad nodes 550 to correctly partition the active threads between the child quad nodes 550.

In alternate embodiments, the WIA may include any number of warp indices. As detailed in conjunction with FIG. 5B, in some embodiments, each entry in the WIA may be associated with a single warp instead of a quad-warp. In alternate embodiments, each entry in the WIA may be associated with a pixel sub-tile instead of a warp or a quad-warp.

Figure 5B:
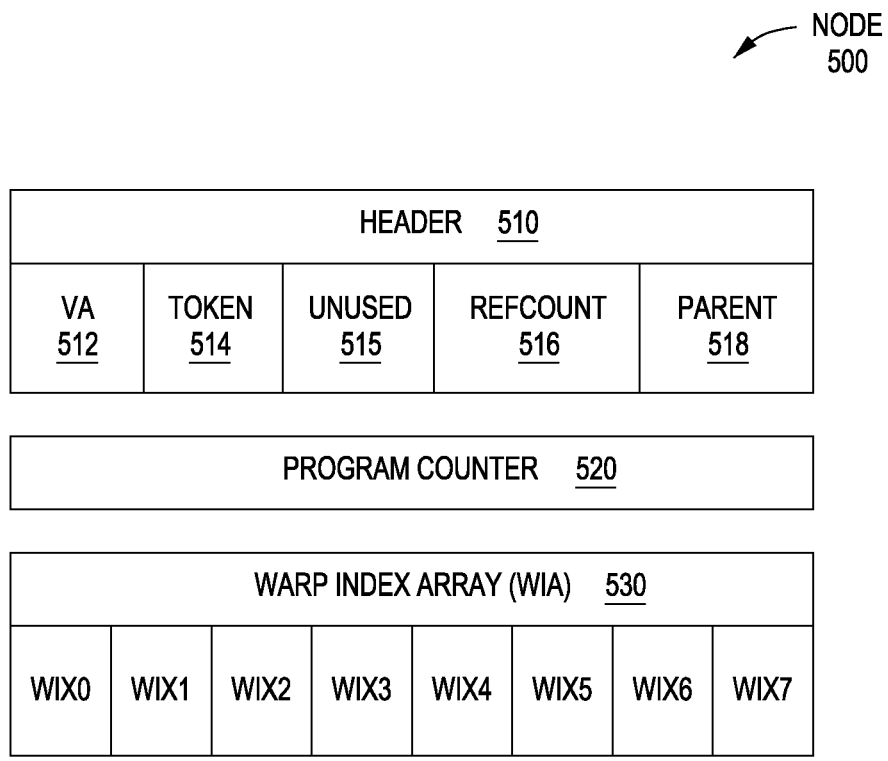
FIG. 5B is a conceptual diagram of a node included in the tree divergence table of FIG. 4, according to one embodiment of the present invention.

FIG. 5B is a conceptual diagram of a node 500 included in the tree divergence table (TDT) 410 of FIG. 4, according to one embodiment of the present invention. The node 500 represents a set of 1-256 threads that are organized as eight warps. As shown, the node 500 includes a header 510, a program counter 520, and a warp index array (WIA) 530. The header 510 includes 4 bytes, the program counter 520 includes 4 bytes, and the WIA 570 includes 8 bytes organized as eight warp indices with 2 bytes unused. Notably, the total memory allocated to the node 500 is 16 bytes, and the node 500 is equivalent to a CRS stack entry. Further, each 32-thread warp may be associated with a maximum of 64 nodes 500 and, consequently, the WIA 530 may vary from 0 through 63. In alternate embodiments, the amount of memory allocated to the node 500 may differ from 16 byes and the node 550 may store the data and partition the allocated memory across any number of different entries.

The SM 310 operates on the node 500 based on the header 510. In operation, if the header 510 specifies that the node 500 is active, then the SM 310 executes instructions specified by the program counter 520 for each active thread in the node 500. By contrast, if the header 510 specifies that the node 500 is not active, then the SM 310 does not execute the node 500. In an inactive parent node, the program counter 520 specifies a specific synchronization point at which the node 500 resumes executing when the node 500 becomes active. The active threads in the node are specified by the WIA 530 in conjunction with ancillary data structures. Advantageously, the ancillary data structures include information that may be shared between multiple nodes, thereby optimizing the use of memory resources, such as the PP memory 204.

As also shown, the header 510 includes the valid/active (VA) 512, the token 514, the refcount 516, the parent 518, and the unused 515. The valid/active 512 and the token 514 both represent the operability of the node 500. Notably, the semantics of the valid/active 512, the token 514, the refcount 516, and the parent 512 with respect to the node 500 correspond to those outlined in conjunction with FIG. 5A with respect to the quad node 550.

In alternate embodiments, the header 510 may store any information in any format that enables the SM 310 to effectively direct the execution of the node 500. For instance, in some embodiments, the header 510 may not include the active/inactive 512, and the acceptable values of the token 514 may be "executable," "non-executable," and "unused." Further, the header 510 may not include the refcount 516. In such embodiments, the SM 310 may compare the active threads across multiple nodes 500 to determine whether the node 500 is a descendent of another node 500. In addition, if the node 500 is a root node, then the parent 518 may be a null value.

The WIA 530 includes eight warp indices (wixs), each of which corresponds to a different warp. In some embodiments, the SM 310 is configured to operate on a subset of the entries included in the WIA 530, and the remaining entries are unused. Advantageously, to reduce the memory required to store the node 500, the WIA 530 refers to two ancillary data structures that include information that is shared between multiple nodes 500. For each warp index, the SM 310 uses the position of the warp index to locate a corresponding warp id (wid) included in a warp mapping table (WMT). Subsequently, for each warp index, the SM 310 uses the value of the warp index and the corresponding warp id to locate a warp mask entry included in a two-dimensional warp mask divergence table (WDT). In particular, the value of the warp index corresponds to a column of the WDT and the value of the warp id corresponds to a row of the WDT.

In operation, if the token 514 is "none" and the instruction specified by the program counter 520 causes the active threads specified by the WIA 530 to diverge, then the SM 310 creates child nodes 500. Each child node 500 represents a different execution path. Accordingly, the SM 310 sets the program counter 520 included in child nodes 500 to different instructions. Further, as detailed in conjunction with FIG. 6, the SM 310 sets the WIAs 530 included in the child nodes 500 to correctly partition the active threads between the child nodes 500.

Figure 6:
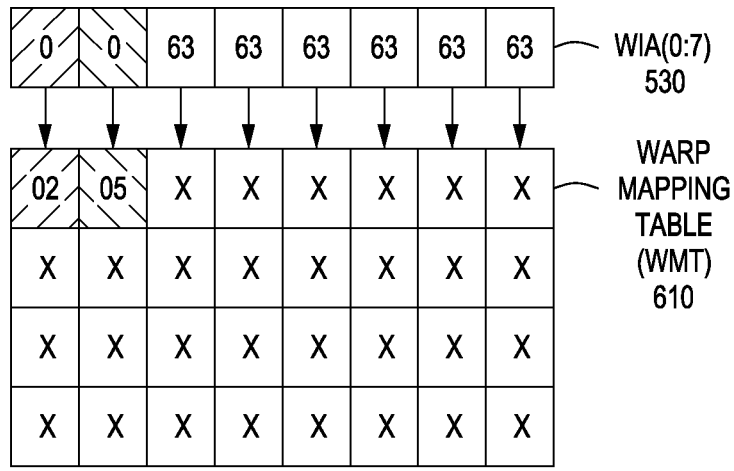
FIG. 6 is a conceptual diagram of a warp mapping table and a warp divergence mask table that are associated with the node of FIG. 5B, according to one embodiment of the present invention.

FIG. 6 is a conceptual diagram of a warp mapping table (WMT) 610 and a warp divergence mask table (WDT) 620 that are associated with the node 500 of FIG. 5B, according to one embodiment of the present invention. As part of launching a CTA, the SM 310 creates a CTA-specific WMT 610. Each entry included in the WMT 610 represents a physical warp id (wid). Notably, the contents of the WMT 610 do not change while the SM 310 is executing the threads in the CTA. Further, the structure of the WIAs 530 included in the execution nodes 500 corresponding to a particular CTA mirror the structure of the WMT 610 corresponding to the CTA. To enable the WMT 310 to easily support quad-warps in addition to warps, there are four entries per warp index (wix). In operation, the address specified by the WIA(0:2) 530 corresponds to the WMT 310, while the data included in the WIA 530 corresponds to the WDT 620.

The WDT 620 includes warp masks that the SM 310 applies to the corresponding warp to determine a subset of active threads. As shown, the WDT 620 is a two-dimensional table in which each row corresponds to a different warp id, and each column corresponds to a different warp index. As also shown, each entry in the WDT 620 includes 32 bits, with each bit representing a separate thread included in the warp. If the value of the bit corresponding to a thread is equal to binary '1,' then the thread is active. If the value of the bit corresponding to the thread is equal to binary '0,' then the thread is not active.

As part of launching a CTA, the SM 310 adds warp masks to the WDT 620 based on the CTA-specific WMT 610 and assigns the WIA 530 associated with the root node 500 to specify the correct warp masks for each warp. As the active threads included in a warp diverge, the SM 310 adds one or more new warp masks to the WDT 620 and updates the WIA 530 associated with the child nodes 500 to specify the node-specific warp mask for the warp.

FIG. 6 depicts the eight entries included in the WIA 530 as WIA(0:7) 530. Correspondingly, the WMT 610 includes 8 valid entries and 24 unused entries. By contrast, in quad-warp mode, the WMT 610 includes 32 valid entries. As shown, the first entry in the WIA 530 corresponds to the first entry in the WMT 610, the second entry included in the WIA 530 corresponds to the second entry in the WMT 610, and so forth. Together, the first entries in the WIA 530 and the WMT 610 specify that the node 500 is associated with the warp index 0 and the warp id 2. The second entries in the WIA 530 and the WMT 610 specify that the node 500 is also associated with the warp index 0 and the warp id 5.

After determining the warp indices and the warp ids associated with the node 500, the SM 310 performs one or more look-up operations on the WDT 620. For each warp, the SM 310 uses the warp index as a column index and the warp id as a row index. As shown, the SM 310 determines the active threads associated with the node 500 by applying the warp mask 0xFFFFFFFF to the warp specified by the warp id 2 and the warp mask 0xFFFFFFFF to the warp specified by the warp id 5. Consequently, for all the threads included in the warps specified by the warp id 2 and the warp id 5, the SM 310 executes the instructions specified by the program counter 520 included in the node 500. There are no other warps included in the CTA associated with the node 500, so the WMT 610 does not include any other warp indices. Further, the SM 520 sets the unused entries included in the WIA 530 to the warp id 63, which references the warp mask 0x00000000.

In alternate embodiments, the WIA 530 may include memory locations for any number of warp indices, the WMT 610 may include memory locations for any number of warp ids, and the WDT 620 may include memory locations for any number of warp masks. Further, in some alternate embodiments, each entry in the WIA 530 may be associated with a quad-warp or a pixel sub-tile instead of a warp, and the process to determine the active threads associated with each node 500 may be modified accordingly.

Figure 7:
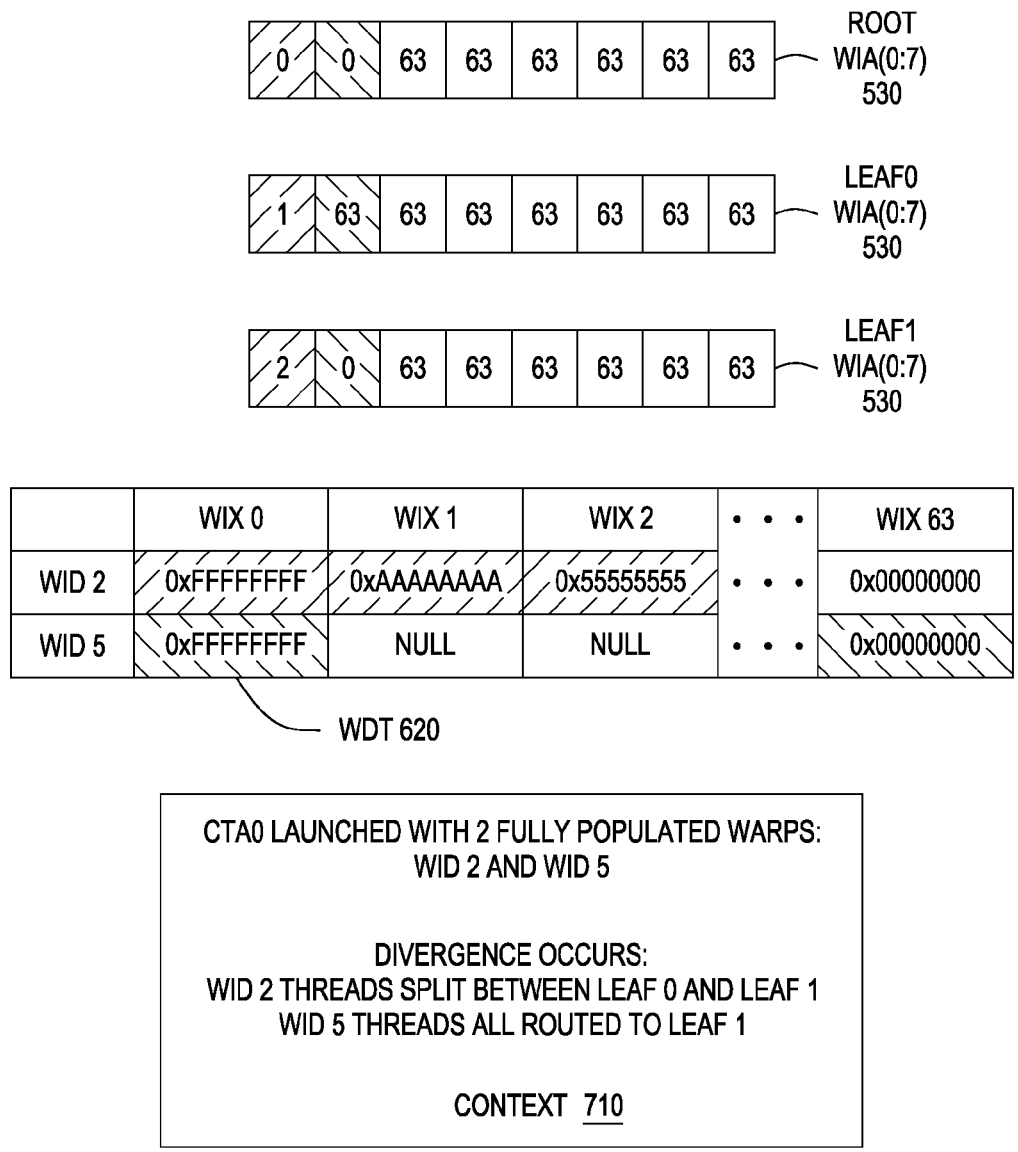
FIG. 7 is a conceptual diagram of the warp index arrays of FIG. 5B and the warp divergence mask table of FIG. 6 corresponding to a cooperative thread array, according to one embodiment of the present invention.

FIG. 7 is a conceptual diagram of the warp index arrays (WIA) 530 of FIG. 5B and the warp divergence mask table (WDT) 620 of FIG. 6 corresponding to a cooperative thread array (CTA), according to one embodiment of the present invention. For explanatory purposes only, a context 710 is that the SM 310 launched the CTA0 420 of FIG. 4 with 2 fully populated (i.e., all threads active) warps specified by warp id 2 and warp id 5. The warp specified by warp id 2 is referred to herein as warp 2. Similarly, the warp specified by warp id 5 is referred to herein as warp 5. As part of launching the CTA0 420, the SM 310 created the WMT 610 of FIG. 6 and added two warp masks with the value 0xFFFFFFFF to the column of the WDT 620 corresponding to the warp index 0. Further, the SM 310 created a root node 500, and set the first two entries in the WIA(0:7) 530 included in the root node 500 to the warp index 0.

Subsequently, the SM 310 executes an instruction that causes the threads included in the warp 2 to diverge. More specifically, a subset of the threads included in the warp 2 follow one execution path, and the remaining threads included in the warp 2 and all the threads included in the warp 5 follow a separate execution path. To manage the concurrent execution of the divergent threads, the SM 310 creates two child nodes 500, leaf0 and leaf1. As shown, the SM 310 adds two new warp masks to the row of the WDT 620 corresponding to the diverging warp, warp 2. More specifically, the SM 310 adds the warp mask 0xAAAAAAAA to the column of the WDT 620 corresponding to the warp index 1 and the warp mask 0x55555555 to the column of the WDT 620 corresponding to the warp index 2. Further, the SM 310 updates the WIA(0:7) 530 of the leaf0 node 500 to specify that the warp 2 is associated with the warp mask 0xAAAAAAAA and the warp 5 is associated with the warp mask 0x00000000 (i.e., no threads included in the warp 5 are active for the leaf0 node 500). Similarly, the SM 310 updates the WIA(0:7) 530 of the leaf1 node 500 to specify that the warp 2 is associated with the warp mask 0x55555555 and the warp id 5 is associated with the warp mask 0xFFFFFFFF. The warp masks 0xAAAAAAAA and 0xFFFFFFFF are for explanatory purposes only. In general, divergent node execution determines the value of each warp mask and, consequently, each warp mask be assigned any appropriate value without limitation.

Advantageously, the techniques disclosed herein enable the SM 310 to optimize the memory used to store data associated with managing the threads executing on the SM 310. For instance, the WDT 620 stores five active warp masks to represent the active threads associated with the root, leaf0, and leaf1 nodes 500. By contrast, if each node 500 were configured to independently store warp masks, then the root, leaf0, and leaf1 nodes 500 would each store two warp masks. Further, in some embodiments, the amount of memory the SM 310 allocates to store the warp masks may be based on the maximum number of warp masks. In such embodiments, the memory that the SM 310 allocates to store the warp masks included in the WDT 620 is sufficient to store 64 warp masks for each of 64 warps—a total of 4096 warp masks per TDT 410. By contrast, if the SM 310 were to store the warp masks separately for each node 500, then the SM 310 would allocate 4096 warp masks per node. In alternate embodiments, the TDT 410, the nodes 500, the WMT 610, and the WDT 620 may be configured to support any number of warps, quad-warps, or pixel sub-groups. Further, the nodes 500 and the WDT 620 may be configured to support any number of warp masks, quad-warp masks, or pixel sub-group masks.

Figure 8A:
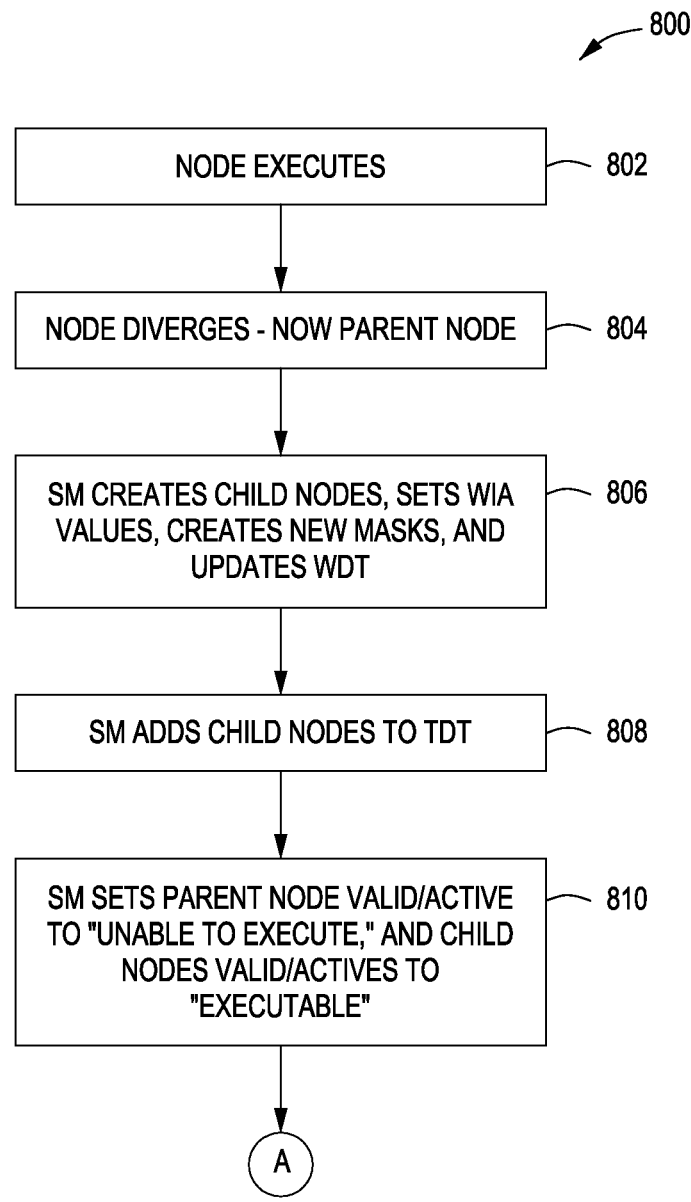
FIGS. 8A-8B set forth a flow diagram of method steps for managing a cooperative thread array, according to one embodiment of the present invention.
Figure 8B:
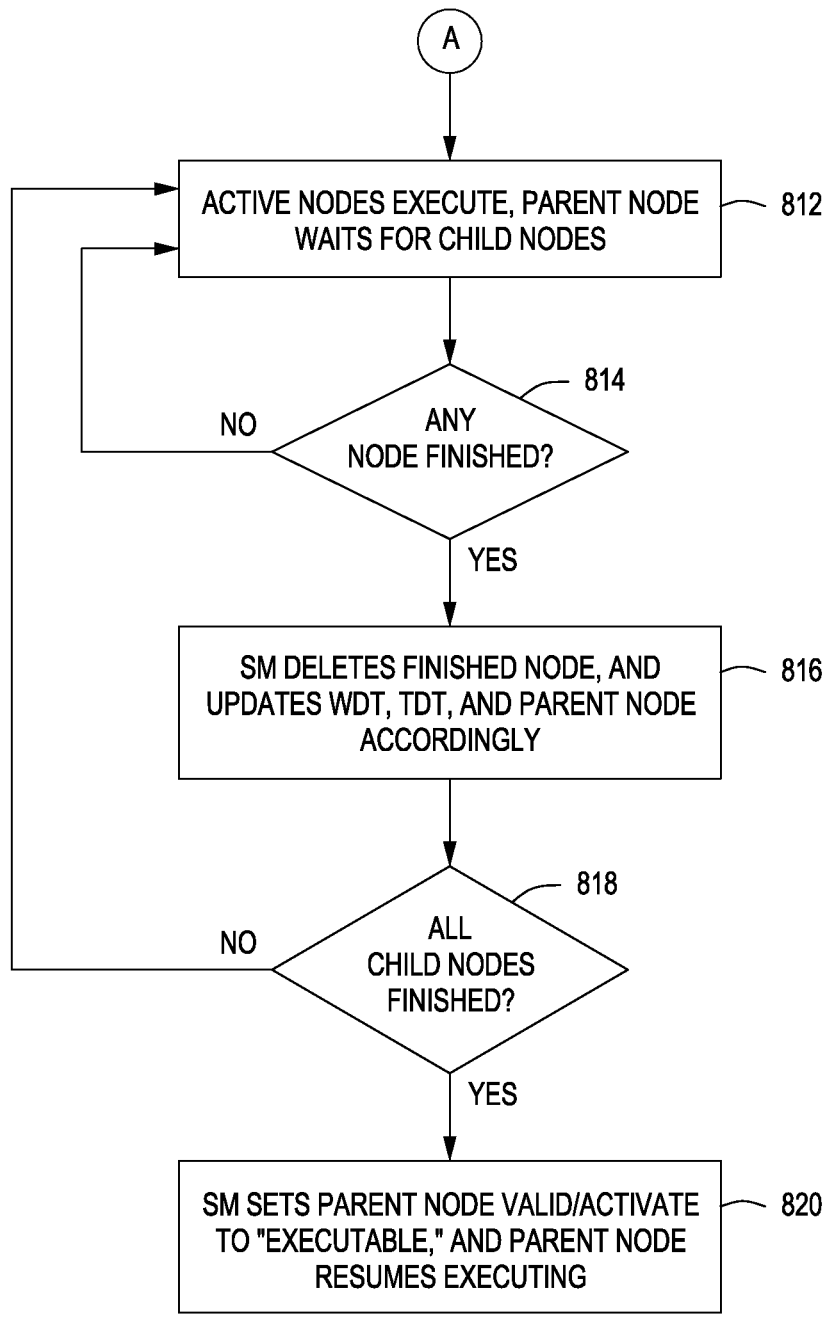

FIGS. 8A-8B set forth a flow diagram of method steps for managing a cooperative thread array (CTA), according to one embodiment of the present invention. Although the method steps are described with reference to the systems of FIGS. 1-7, persons skilled in the art will understand that any system configured to implement the method steps, in any order, falls within the scope of the present invention.

As shown, a method 800 begins at step 802, where the SM 310 creates and executes a particular node 500 associated with a CTA. As previously disclosed herein, the SM 310 sets the WIA 520 included in the node 500 and updates the WDT 620 to specify the active threads of the CTA based on the CTA-specific WMT 620. Subsequently, the SM 310 launches the CTA. For each of the active threads, the SM 310 executes the instruction specified by the program counter 520 included in the node 500. At step 804, the SM 310 determines that executing the instruction specified by the program counter 520 included in the node 500 causes the active threads of the CTA to diverge. The node 500 is now referred to as a "parent" node. At step 806, the SM 310 creates one or more child nodes 500—each child node 500 corresponding to a different execution path. In particular, the SM 310 specifies new masks in the WDT 620 and updates the WIAs 530 included in the child nodes 500 such that each child node 500 specifies a different, mutually exclusive subset of the active threads associated with the parent node 500. Further, the SM 310 sets the program counter 520 included in each child node 500 to point to a different instruction, thereby directing each subset of threads to the appropriate execution path. At step 808, the SM 310 adds the child nodes 500 to the row included in the TDT 410 that corresponds to the CTA that is associated with the parent node 500.

At step 810, the SM 310 sets the valid/active 512 included in the parent node 500 to "unable to execute" and the token 514 included in the parent node 500 to "SYNC," thereby indicating that the parent node 500 is the target of a synchronization operation. Further, the SM 310 sets the program counter 520 included in the parent node 500 to a specific synchronization point—the target to which the active threads specified by the parent node 500 reconverge. In addition, the SM 310 sets the refcount 516 included in the parent node 500 based on the number of child nodes 500, and the parent 518 included in each of the child nodes 500 to specify the parent node 500. Finally, for each of the child nodes 500, the SM 310 sets the valid/active 512 to "executable" and the token 514 to "none." At step 812, based on the values of the valid/actives 512 and/or the tokens 514, the SM 310 temporarily ceases executing instructions specified by the program counter 520 included in the parent node 500 and begins executing instructions specified by the program counters 520 included in the child nodes 500.

As previously disclosed herein, the SM 310 executes the leaf nodes 500 concurrently, and the warp masks specified by the leaf nodes 500 ensure that no thread is executed by more than one leaf node 500. Notably, the SM 310 considers each of the child nodes 500 to be a leaf node 500 until the child node 500 diverges or has finished executing. If a leaf node 500 diverges, then the SM 310 creates one or more additional child nodes 500 at a lower level in the hierarchy of the tree that is associated with the parent node 500. If, at step 814, the SM 310 determines that none of the leaf nodes 500 has finished executing, then the method 800 returns to step 812, and the leaf nodes 500 continue to execute. The SM 310 repeatedly cycles through steps 812 through 814, executing successive instructions specified by the program counters 520 included in the leaf nodes 500 until at least one of the leaf nodes 500 has finished executing.

If, at step 814, the SM 310 determines that at least one of the leaf nodes 500 has finished executing, then the method proceeds to step 816. The SM 310 may determine that the leaf node 500 has finished executing in any technically feasible fashion. For instance, the SM 310 may determine that the instruction specified by the program counter 520 included in the leaf node 500 is a pop-synchronization instruction that causes a divergent execution path to reconverge to the parent execution path. At step 816, the SM 310 deletes the leaf nodes 500 that have finished executing. As part of deleting the leaf nodes 500, the SM 310 updates the WDT 620, the TDT 410, and parent nodes 550 accordingly. For instance, the SM 310 may remove any number of warp masks from the WDT 620, remove the completed leaf nodes 500 from the TDT 410, and update the refcounts 516 included in parent nodes 500. If, at step 818, the SM 310 determines that any of the child nodes 500 associated with the parent node 500 have not finished executing, then the method 800 returns to step 812, previously described herein. The SM 310 repeatedly cycles through steps 812 through 818, executing successive instructions based on the program counters 520 included in the leaf nodes 500 until all the child nodes 500 associated with the parent node 500 have finished executing.

At step 818, if the SM 310 determines that all the child nodes 500 associated with the parent node 500 have completed executing, then the method 800 proceeds to step 820. The SM 310 may determine that all the child nodes 500 have finished executing in any technically feasible fashion. For example, the SM 310 may determine that the refcount 516 included in the parent node 500 is zero. At step 820, the SM 310 sets the valid/active 512 included in the parent node 500 to "executable" and the token 514 included in the parent node 500 to "none." Subsequently, the SM 310 resumes executing the active threads specified by the parent node 500 based on the synchronization point specified by the program counter 520 included in the parent node 500.

Figure 9:
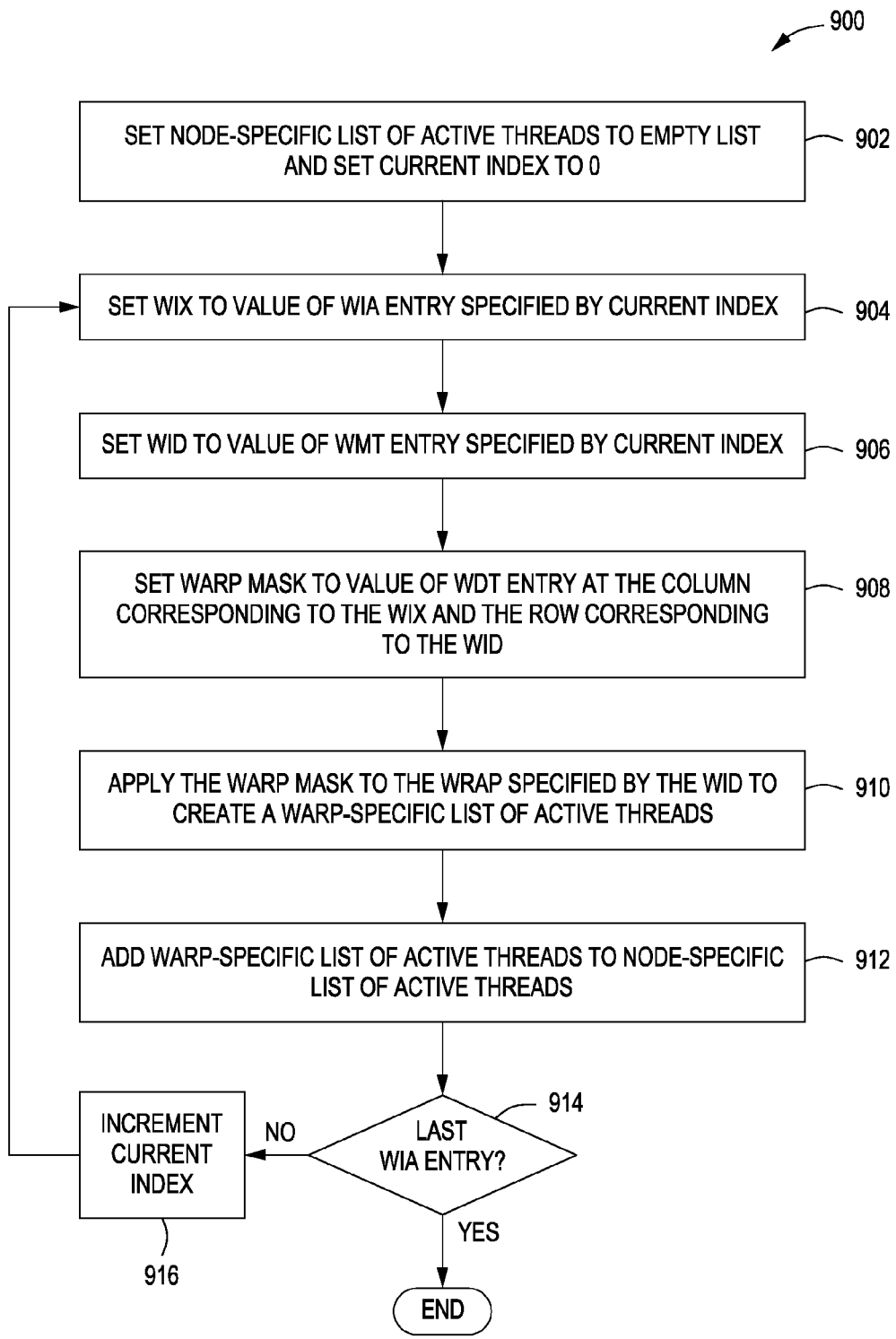
FIG. 9 sets forth a flow diagram of method steps for determining which threads in a cooperative thread array are active for a particular execution path, according to one embodiment of the present invention.

FIG. 9 sets forth a flow diagram of method steps for determining which threads in a CTA are active for a particular execution path, according to one embodiment of the present invention. Although the method steps are described with reference to the systems of FIGS. 1-7, persons skilled in the art will understand that any system configured to implement the method steps, in any order, falls within the scope of the present invention.

As shown, a method 900 begins at step 902, where the SM 310 sets a node-specific list of active threads included in a CTA to an empty list and sets a current index to 0. At step 904, the SM 310 accesses the WIA array 530 associated with the current node and sets a warp index to the value of the WIA array 530 entry specified by the current index. At step 906, the SM 310 accesses the CTA-specific WMT 610 and sets a warp id to the value of the WMT 610 entry specified by the current index. At step 908, the SM accesses the WDT 620 associated with the CTA and sets a warp mask to the value of the WDT 620 entry located at the intersection of the column specified by the warp index and the row corresponding to the warp id.

At step 910, the SM 310 applies the warp mask to the warp specified by the warp id to create a warp-specific list of active threads. At step 912, the SM 310 adds the warp-specific list of active threads to the node-specific list of active threads. At step 914, if the SM 310 determines that the current index corresponds to the last entry included in the WIA 530, then the method 900 terminates.

If, at step 914, the SM 310 determines that the current index does not correspond to the last entry included in the WIA 530, then the method 900 proceeds to step 916. At step 916, the SM 310 increments the current index, and the method 900 returns to step 904, where the SM 310 processes the next entry in the WIA 530. The SM 310 repeatedly cycles through steps 904 through 914, adding the active threads in each warp to the node-specific list of active thread until the SM 310 determines that the SM 310 has processed all of the entries include in the WIA 530, and the method 900 terminates.

In sum, an SM within a PPU is configured to manage the threads in a CTA executing on the SM using a tree of nodes, where each individual node includes call return stack functionality. When the CTA launches, the SM generates a root node and executes instructions for each active thread in the CTA. When an executing node diverges, the SM creates a separate child node for each execution path and links the child nodes back to the executing node, which becomes the parent node of the new child nodes. The SM sets warp masks and a PC included in each child node based on the assignment of threads to the divergent paths, assigns the PC for the parent node to a synchronization point, disables execution of the parent node, and enables execution of the child nodes.

In operation, the child nodes may execute in parallel. Notably, the different warp masks enable each node to execute the appropriate subset of threads and ensure that no thread is executed simultaneously by two nodes. When a child node has finished executing, the SM updates the parent node to reflect that the parent node is no longer waiting for that child node to complete execution and also deletes the child node. When all child nodes associated with a parent node have finished executing, the SM enables the parent node and, subsequently, the parent node resumes executing.

In one instance, the tree of nodes is implemented as a flattened two-dimensional tree divergence table (TDT). Each row of the TDT represents a CTA executing on the SM. In particular, each row includes a single root node and the tree nodes descended from that root node in a linear fashion. Each node includes a pointer to the parent node, a program counter, node-specific header information, and a warp index array (WIA). Further, each node refers to ancillary data structures that include information that is relevant to one or more nodes. In particular, each node refers to a CTA-specific warp mapping table (WMT) and a CTA-specific warp divergence mask table (WDT).

The WMT stores the warp ids of the warps that are assigned to the CTA when the CTA is launched. The WDT stores all the active warp masks that are generated by the SM as part of managing the execution of the different threads included in the CTA. Notably, each row of the WDT represents a warp that is associated with a different warp id. When a particular warp diverges, the SM adds one or more new warp masks to the corresponding row of the WDT. Similarly, when a particular warp converges, the SM deletes unused warp masks. In addition, the SM maintains the WIA for each node such that the information included in the WIA in conjunction with the WMT and the WDT specify the threads of the CTA that are active for the node.

Advantageously, managing the threads using a tree of nodes enables the SM to execute divergent paths in parallel. Thus, undesirable consequences attributable to serializing divergent paths across warps in conventional thread management techniques may be avoided, resulting in more reliable forward progress through a program. Further, algorithms specified in software application text files that could not be properly implemented using conventional SIMT techniques may be translated to machine instructions that execute in a deterministic fashion. And, because divergent threads may execute in parallel, the speed at which an SM executes a program that includes divergent paths may improve. In addition, the SM may use ancillary data structures designed to efficiently store data associated with the nodes to optimize the use of memory resources.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as compact disc read only memory (CD-ROM) disks readable by a CD-ROM drive, flash memory, read only memory (ROM) chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons of ordinary skill in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

Therefore, the scope of embodiments of the present invention is set forth in the claims that follow.

The invention claimed is:

1. A computer-implemented method for managing threads, the method comprising:
    causing a first set of threads to execute a first instruction that is specified by a first program counter, wherein the first set of threads and the first program counter are included in a first node of a tree divergence table;
    if causing the first set of threads to execute the first instruction causes a first execution path to diverge, then:
        generating a second node of the tree divergence table that includes a second set of threads that is a subset of the first set of threads and a second program counter that specifies a second instruction,
        generating a third node of the tree divergence table that includes a third set of threads that is a subset of the first set of threads and a third program counter that specifies a third instruction that is on a second execution path,
        updating the first program counter to specify a synchronization instruction, and
        causing the second set of threads to execute the second instruction and the third set of threads to execute the third instruction; and
    if causing the first set of threads to execute the first instruction does not cause the first execution path to diverge, then:
        updating the first program counter to specify a fourth instruction, and
        causing the first set of threads to execute the fourth instruction.

2. The method of claim 1, wherein both the second node and the third node include a parent field that specifies the first node.

3. The method of claim 2, wherein the first node includes a parent field that is empty.

4. The method of claim 1, wherein the second set of threads and the third set of threads are mutually exclusive subsets of the first set of threads.

5. The method of claim 4, wherein the sum of the number of threads included in the second set of threads and the number of threads included in third set of threads is less that the number of threads included in the first set of threads.

6. The method of claim 4, wherein the second set of threads comprises a single thread.

7. The method of claim 1, further comprising updating the second program counter to specify a first convergence instruction, causing the second set of threads to execute the first convergence instruction, and deleting the second node of the tree divergence table.

8. The method of claim 7, further comprising:
    updating the third program counter to specify a second convergence instruction;
    causing the third set of threads to execute the second convergence instruction;
    deleting the third node of the tree divergence table;
    updating the first program counter to specify a fifth instruction; and
    causing the first set of threads to execute the fifth instruction.

9. The method of claim 1, wherein the second set of threads executes the second instruction and the third set of threads execute the third instruction in parallel.

10. A non-transitory computer-readable storage medium including instructions that, when executed by a processing unit, cause the processing unit to manage threads, by performing the steps of:
    causing a first set of threads to execute a first instruction that is specified by a first program counter, wherein the first set of threads and the first program counter are included in a first node of a tree divergence table;
    if causing the first set of threads to execute the first instruction causes a first execution path to diverge, then:
        generating a second node of the tree divergence table that includes a second set of threads that is a subset of the first set of threads and a second program counter that specifies a second instruction,
        generating a third node of the tree divergence table that includes a third set of threads that is a subset of the first set of threads and a third program counter that specifies a third instruction that is on a second execution path,
        updating the first program counter to specify a synchronization instruction, and
        causing the second set of threads to execute the second instruction and the third set of threads to execute the third instruction; and
    if causing the first set of threads to execute the first instruction does not cause the first execution path to diverge, then:
        updating the first program counter to specify a fourth instruction, and
        causing the first set of threads to execute the fourth instruction.

11. The non-transitory computer-readable storage medium of claim 10, wherein both the second node and the third node include a parent field that specifies the first node.

12. The non-transitory computer-readable storage medium of claim 11, wherein the first node includes a parent field that is empty.

13. The non-transitory computer-readable storage medium of claim 10, wherein the second set of threads and the third set of threads are mutually exclusive subsets of the first set of threads.

14. The non-transitory computer-readable storage medium of claim 13, wherein the sum of the number of threads included in the second set of threads and the number of threads included in third set of threads is less that the number of threads included in the first set of threads.

15. The non-transitory computer-readable storage medium of claim 13, wherein the second set of threads comprises a single thread.

16. The non-transitory computer-readable storage medium of claim 10, further comprising updating the second program counter to specify a first convergence instruction, causing the second set of threads to execute the first convergence instruction, and deleting the second node of the tree divergence table.

17. The non-transitory computer-readable storage medium of claim 16, further comprising:

updating the third program counter to specify a second convergence instruction;
causing the third set of threads to execute the second convergence instruction;
deleting the third node of the tree divergence table;
updating the first program counter to specify a fifth instruction; and
causing the first set of threads to execute the fifth instruction.

18. The non-transitory computer-readable storage medium of claim 10, wherein the second set of threads execute the second instruction and the third set of threads execute the third instruction in parallel.

19. A system configured to perform a manage threads, the system comprising:
   a memory that includes a tree divergence table; and
   a processing unit coupled to the memory and configured to:
      cause a first set of threads to execute a first instruction that is specified by a first program counter, wherein the first set of threads and the first program counter are included in a first node of the tree divergence table;
      if causing the first set of threads to execute the first instruction causes a first execution path to diverge, then:
         generate a second node of the tree divergence table that includes a second set of threads that is a subset of the first set of threads and a second program counter that specifies a second instruction,
         generate a third node of the tree divergence table that includes a third set of threads that is a subset of the first set of threads and a third program counter that specifies a third instruction that is on a second execution path,
         update the first program counter to specify a synchronization instruction, and
         cause the second set of threads to execute the second instruction and the third set of threads to execute the third instruction; and
      if causing the first set of threads to execute the first instruction does not cause the first execution path to diverge, then:
         update the first program counter to specify a fourth instruction, and
         cause the first set of threads to execute the fourth instruction.

20. The system of claim 19, wherein the processing unit comprises a parallel processing unit or a streaming multi-processor included in the parallel processing unit.

* * * * *